(12) United States Patent
Chan et al.

(10) Patent No.: US 8,970,845 B1
(45) Date of Patent: Mar. 3, 2015

(54) IN-SITU THREE-DIMENSIONAL SHAPE RENDERING FROM STRAIN VALUES OBTAINED THROUGH OPTICAL FIBER SENSORS

(71) Applicant: The United States of America as Represented by the Administrator of NASA, Washington, DC (US)

(72) Inventors: Hon Man Chan, Canyon Country, CA (US); Allen R. Parker, Jr., Lancaster, CA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/106,947

(22) Filed: Dec. 16, 2013

Related U.S. Application Data

(62) Division of application No. 13/485,187, filed on May 31, 2012, now abandoned.

(51) Int. Cl.
*G01B 9/02* (2006.01)
*G01M 11/00* (2006.01)

(52) U.S. Cl.
CPC ..................................... *G01M 11/30* (2013.01)
USPC ......................................................... 356/478

(58) Field of Classification Search
CPC ...... G01M 11/30; G01M 11/83; G01M 11/85
USPC ............ 356/478; 73/800; 702/41–43; 385/13
See application file for complete search history.

(56) References Cited

U.S. PATENT DOCUMENTS 6,256,090 B1 * 7/2001 Chen et al. .................... 356/73.1
7,813,599 B2 * 10/2010 Moore ............................. 385/13

* cited by examiner

*Primary Examiner* — Tarifur Chowdhury
*Assistant Examiner* — Jonathon Cook
(74) *Attorney, Agent, or Firm* — Mark Homer

(57) ABSTRACT

A method and system for rendering the shape of a multi-core optical fiber or multi-fiber bundle in three-dimensional space in real time based on measured fiber strain data. Three optical fiber cores arc arranged in parallel at 120° intervals about a central axis. A series of longitudinally co-located strain sensor triplets, typically fiber Bragg gratings, are positioned along the length of each fiber at known intervals. A tunable laser interrogates the sensors to detect strain on the fiber cores. Software determines the strain magnitude (ΔL/L) for each fiber at a given triplet, but then applies beam theory to calculate curvature, beading angle and torsion of the fiber bundle, and from there it determines the shape of the fiber in s Cartesian coordinate system by solving a series of ordinary differential equations expanded from the Frenet-Serrat equations. This approach eliminates the need for computationally time-intensive curve-tilting and allows the three-dimensional shape of the optical fiber assembly to be displayed in real-time.

10 Claims, 5 Drawing Sheets

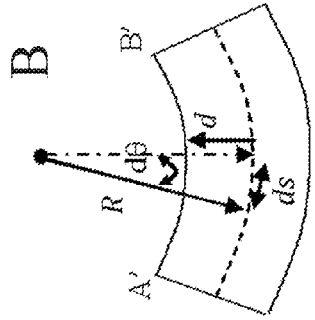
FIG. 8
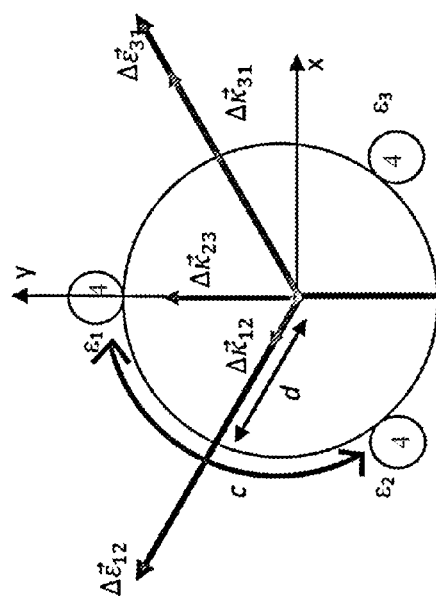
FIG. 7
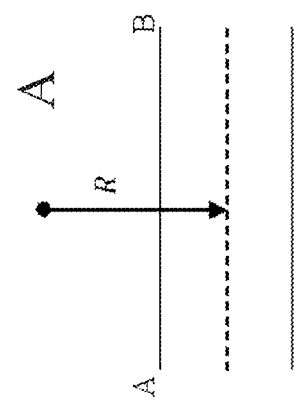

IN-SITU THREE-DIMENSIONAL SHAPE RENDERING FROM STRAIN VALUES OBTAINED THROUGH OPTICAL FIBER SENSORS

This application, as a divisional therefrom, claims priority to application 13/485,187, filed May 5, 2012.

CLAIM OF PRIORITY AND STATEMENT OF GOVERNMENT RIGHTS

The invention described herein may be manufactured and used by or for the Government of the United States of America for governmental purposes without payment of any royalties thereon or therefor.

BACKGROUND OF THE INVENTION

1. Field of the Invention

The present invention relates to optical fiber sensing systems and. more specifically, to a method and system of rendering the shape of a multi-core optical fiber cr multi-fiber bundle in three-dimensional space in real time based on measured fiber strain data.

2. Description of the Background

There are many diverse engineering applications where determining or monitoring the shape of an article or structure is of paramount importance. The science of determining changes to the material and/or geometric properties of a structure is referred to as Structural Health Monitoring (SHM). Generally, SHM involves the observation of a structure over time using periodically sampled measurements from an array of sensors, and the analysis of these measurements to determine the current state of structural health. There are many different sensors and sensing networks for accomplishing this, but many have inherent limitations that render them unsuitable in certain applications. For example, in the field of aeronautics traditional structural health-monitoring of aircraft wings typically involves the use of photogrammetry. In photogrammetry, strategic portions of the aircraft are marked beforehand and a baseline photograph is taken and calibrated to determine the initial displacement. When the wing is under deflection through testing, it is monitored by comparing pre-deflection and post-deflection photographs. This technique requires a clear line of sight, and oftentimes the use of any direct line-of-sight monitoring is either impossible or impractical. Thus, while suitable as for a controlled testing environment the technique of photogrammetry is impractical to monitor aircraft wing-shape in actual flight due to changes in lighting (night-time versus daytime). The same rationale holds for bridges, other concrete structures, and most any solid structure where there is no line of sight through the structure itself. Other techniques include wired networks of strain or temperature sensors, accelerometers, or the like which entails complex wiring layouts. These are costly and impractical, and indeed the wires tend to corrode with age.

Another technique that is rapidly gaining in popularity involves fiber optic sensing networks. See. e.g., Tennyson, "Monitoring Bridge Structures Using Long Gage-Length Fiber Optic Sensors". Caltrans Bridge Research Conference (2005). Optical fiber sensors typically involve a light propagating beam which travels along an optical filler network. Within each fiber the light is modulated as a function of strain, temperature, bending or other physical or chemical stimuli. The modulation can be analyzed in cither reflection or transmission to determine the characteristic of interest. Optical fiber sensors (OFS) have many distinct advantages including immunity to electromagnetic interference, long lifetime, lightweight, small size, low cost, high sensitivity, etc. Serially multiplexed or branched OFS networks are especially suitable for SHM of large and/or distributed structures which usually need a lot of measurement points.

Sensing the shape of an optical fiber is useful in many applications ranging for example, from manufacturing and construction to medicine and aerospace. In most of these applications, the shape sensing system mast be able to accurately determine the position of the fiber, e.g., within less than one percent of its length, and in many cases, less than one tenth of one percent of its length. There are a number of approaches to the shape measurement problem, but none adequately addresses the requirements of most applications because they are too slow, do not approach the required accuracies, do not function in the presence of tight bends, or fail to adequately account for twist of the fiber (the presence of torsional forces that twist the fiber undermine the accuracy, and thus, usefulness of these approaches).

Conventional approaches to measuring the shape of a fiber use strain as the fundamental measurement signal. Strain is a ratio of the change in length of a fiber segment post-stress verses the original length of that segment (pre-stress). As an object like a fiber is bent, material on the outside of the bend is elongated, while the material on the inside of the bend is compressed. Knowing these changes in local strain and knowing the original position of the object, an approximation of the new position of the fiber can be made. There are even efforts to account for torsional forces.

For example, U.S. Pat. No. 7,813,599 to Jason Moore issued Oct. 12, 2010 discloses a method of determining the shape of an unbounded optical fiber by collecting strain data along a length of the fiber, calculating curvature and bending direction data of the fiber using the strain data, curve-fitting the curvature and bending direction data to derive curvature and bending direction functions, calculating a torsion function using the bending direction function, and determining the 3D shape from the curvature, bending direction, and torsion functions. An apparatus for determining the 3D shape of the fiber inclines a fiber optic cable unbound with respect to a protective sleeve, strain sensors positioned along the cable, and a controller in communication with the sensors. The controller has an algorithm for determining a 3D shape and end position of the fiber by calculating a set of curvature and bending direction data, deriving curvature, bending, and torsion functions, and solving Frenet-Serret equations using these functions.

In order to effectively sense position with high accuracy, several key factors must be addressed. First, for a strain-based approach, the strain measurements are preferably accurate to tens of nanostrain (10 parts per billion) levels. Such high accuracy strain measurements are not readily attainable by conventional resistive or optical strain gauges. Therefore, a new technique that is not strain-based in the conventional sense is required.

Second, the presence of twist in the optical fiber must be measured to a high degree of accuracy and accounted for in the shape computation. The problem is how to obtain an accuracy of rotational position belter than 1 degree. For a high accuracy rotational sensor, the position of strain sensors along the length of the fiber must also be known to a high degree of accuracy. Therefore, some high-accuracy way of measuring the rotation of the fiber is needed to coned the calculation at the fiber position Third, the prior art shape sensing fiber networks such as shown in U.S. application Ser. No. 12/874,901 by Froggatt el al require optical fibers having multiple fiber cores that are helixed at a known rate with Bragg grating sensors (FBGs) (a conventional optical strain gauge). These fibers are extremely difficult and expensive to make.

What is needed is a system and method for optical fiber shape that is capable of achieving nanostrain resolutions and including a high-accuracy measurement of the rotation of the fiber in order to correct the calculation of the fiber position. A system and method with such features would have great utility in traditional SHM systems for most any engineering structures, and would find ready application in non-traditional shape sensing applications such as medical tools (e.g., flexible endoscopes and other minimally invasive surgical instruments) or other systems for monitoring and inspection.

SUMMARY OF THE INVENTION

It is, therefore, an object of the present invention to provide a new, more accurate method and system for fiber-optic sensing shape in three dimensions using multi-core optical fibers.

It is another object to eliminate the compound errors that are experienced with other measurement methods, even for complex shapes.

It is another object of the present invention to provide a method and system for fiber-optic sensing shape in three dimensions that allows the fiber to twist naturally, eliminating the need to bond the fiber optic in place and minimizing internal stresses or the fiber.

It is still another object of the present invention to provide a method and system for fiber-optic sensing shape in three dimensions that is low cost, uses off-the-shelf components and software that can run on standard computing platforms, and which is robust and reliable even in high-temperature and high-pressure environments.

According to the present invention, the above-described and other objects are accomplished by a method and system for rendering the shape of a multi-core optical fiber or multi-fiber bundle in three-dimensional space in real time based on measured fiber strain data. Fiber strain data is determined in a known and previously utilized manner that orients three optical fibers in a parallel arrangement such that they are circularly arrayed at 120° intervals about a central, longitudinal axis. A series of longitudinally co-located strain sensor triplets, typically fiber Bragg gratings, is positioned along the length of each fiber at a known interval. A tunable laser is used to interrogate the sensors using optical frequency domain reflectometry (OFDR), which detects subtle shifts in the wavelength reflected by the sensors in response to strain on the fibers. Each sensor is continuously queried and an algorithm (also known) is applied to determine the strain magnitude ($\Delta L/L$) for each fiber at a given triplet. Given these measured strain values, a novel method of rendering the shape of the fiber is disclosed. The novel method applies beam theory to calculate curvature, bending angle and torsion of the fiber bundle and from that determine the shape of the fiber in a Cartesian coordinate system by solving a series of ordinary differential equations expanded from the Frenet-Serrat equations. Use of the curvature, bending angle, and torsion data calculated from empirically collected strain data eliminates the need for computationally time-intensive curve-fitting as was required in prior art methods. The end result is that three-dimensional shape of the optical fiber can be displayed in real-time.

The proposed method relates the magnitude of curvature of the fiber at a given point to the magnitude of the differential strain in the fibers and the diameter of the fiber assembly (a known constant). Given that the overall strain in the fiber in a given segment is the sum of the interrelated strain values of each fiber, the overall differential strain between each of the three optical fibers is determined and expressed as a vector value. Substituting in the previously defined curvature-differential strain relationship, the overall curvature vector is determined by summation of the individual strain curvature vectors. The overall curvature vector contains both the magnitude and phase angle of the curvature for a given fiber segment. Once the phase angle is known, the torsion value can be determined for each segment as the difference of each subsequent phase angle over the differential curve length. Given the curvature and torsion in conjunction with the known fiber bundle point of origin and orientation, the three-dimensional shape of each segment of the fiber bundle can be determined by solving a series of ordinary differential equations obtained from the Frenet-Serret, and plotted in real time in a global Cartesian coordinate system as the optical fibers are being moved.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 7 is a perspective drawing illustrating differential strain and differential curvature for the three-core optical fiber assembly of either FIGS. 1-2.

FIG. 8 shows the mechanics of a bending optical fiber core 4 along a segment of length of AB.

DETAILED DESCRIPTION OF THE EMBODIMENT

Figure 1:
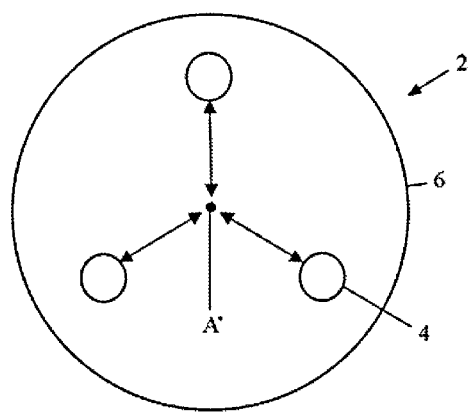
FIG. 1 is a front perspective view of a multi-core optical fiber 2 with three fiber cores 4 arranged in 120 degree separation about a common axis A' in accordance with one embodiment of the invention.
Figure 2:
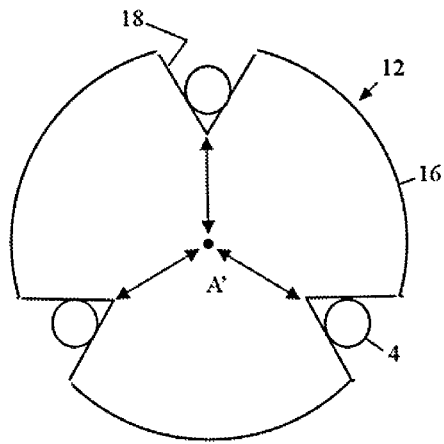
FIG. 2 shows a multi-fiber assembly 12 in which with three discrete uniform optical fiber cores 4 are seated in a plurality of self-centering triangular slots 18 running axially along an elongate elastic body 16 in accordance with another embodiment of the invention.

The present invention is a method and system of rendering the shape of a multi-core optical fiber assembly in three-dimensional Space in real time based on measured fiber strain data. The optical fiber assembly includes three discrete and uniform fiber optic cores run parallel such that they are circularly arrayed at 120° intervals about a central, longitudinal axis. This can be accomplished using a traditional un-bonded multi-core optical fiber. For example, FIG. 1 shows a multi-core optical fiber 2 with three fiber cores 4 arranged in 120 degree separation out a common axis A' and ceased within a common sheath 6. More preferably, FIG. 2 shows a multi-fiber assembly 12 in which with three discrete uniform optical fiber cores 4 are seated in a plurality of self-centering triangular slots 18 running axially along an elongate elastic body 16. The slots 18 themselves maintain a 120 degree separation about a common axis A' and provide automatic alignment the optical fibers 4. One skilled in the art should readily understand that the sheath 6 of FIG. 1 may be added to the embodiment of FIG. 2 resulting in the elongate body 16 encased within the sheath 6 and constraining the fiber cores 4 within their corresponding slots 18.

Figure 3:
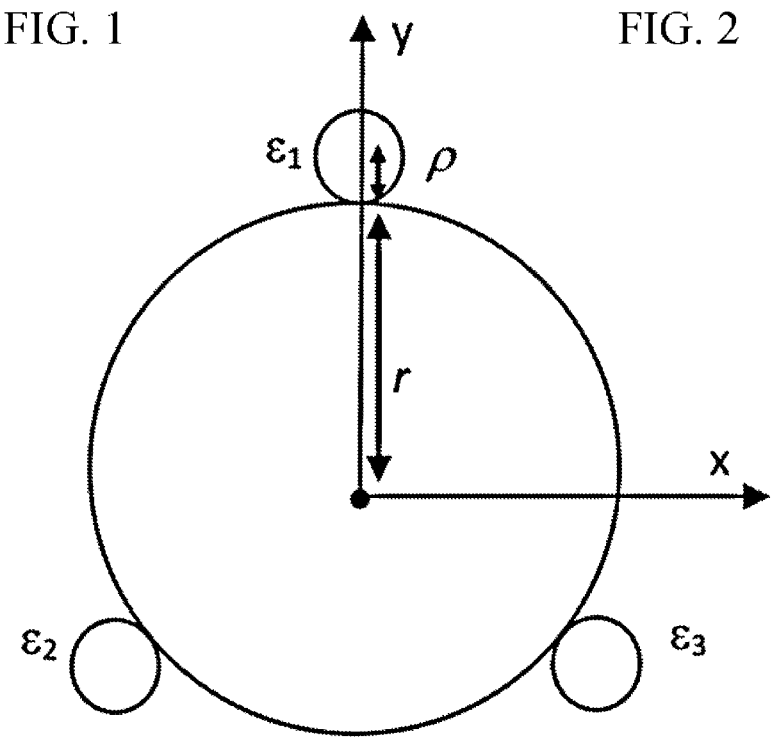
FIG. 3 is a perspective drawing illustrating the cross-sectional geometry of the three optical fiber cores 4 of either FIGS. 1-2.

The foregoing compels the requisite cross-sectional geometry as shown in FIG. 3, in which three optical fiber cores 4 all with radius ρ are radially spaced around a geometrical cylinder with radius r. Each optical fiber core 4 may experience strain change of $\epsilon_m$, and the difference of strain the two fibers exerts upon one another is $\Delta\epsilon_{mn}$.

Figure 4:
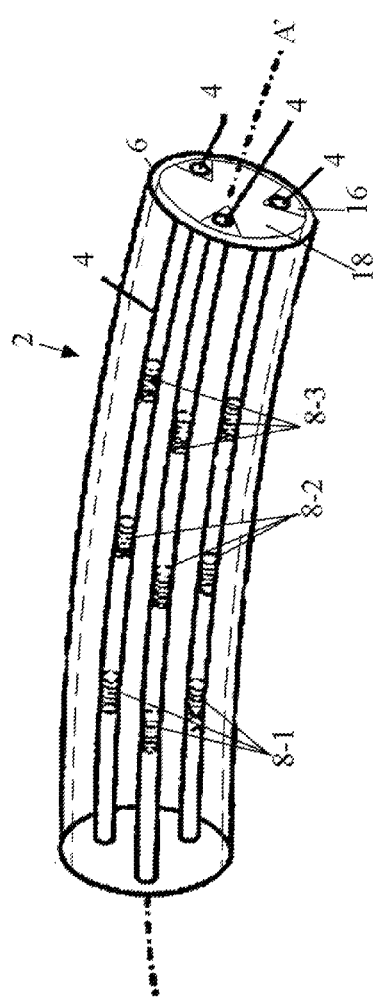
FIG. 4 is a side perspective view of the embodiment of FIG. 2.

As seen in FIG. 4, each optical fiber core 4 is arrayed lengthwise with a series of strain sensors 8-1 ... 3 angularly offset from and evenly-spaced along the center axis A'. The three fiber cores 4 are seated in the elongate body 16 within slots 18, and as per FIG. 1 may be surrounded by the sheath 6. The elongate body 16 and sheath 6 can be constructed of a suitable low refractive index polymer or rubber relative to fiber cores 4, so that light emitted into an end of each core 4 is efficiently transmitted along the entire length. The elongate body 16 is elastic and flexible so as not to obstruct the fiber cores 4 from various bending. Once the fiber cores 4 are seated in the slots 18 of the elongate body 16 they may be fixated via an epoxy or other glue, and/or may be captured therein by sheath 6.

Strain sensors 8 may be any suitable strain, sensor, but are preferably Fiber Bragg Grating (FBG) sensors. There are a variety of known FBG structures including uniform positive-only index change, Gaussian apodized, raised-cosine apodized, chirped, discrete phase shift, or superstructure, and any of the foregoing will suffice. Alternatively. Rayleigh scatter detectors or other strain sensors of the type known in the art can also be used within the scope of the invention.

The fiber cores 4 are each positioned substantially equidistant from the center axis A' and equi-angularly/symmetrically with respect thereto at 120 degree offsets. The sensors 8 are inscribed, written, embedded, or otherwise provided at equally-spaced positions intermittent along the length of each fiber core 4. The sensors 8 are adapted to measure strain data, and to relay the strain data to a controller 20 (to be described). The controller 20 is provided with analytical software for determining the shape of all three optical fiber cores 4 by differential strain data as will be described.

It is important that the entire optical fiber assembly 2 have one bound end affixed to the structure to be monitored, at a calibrated end position. The optical fiber assembly 2 is secured to the structure at the bound end and is prevented from bending or twisting at the bound end. The bound end represents a fixed initial condition for determining a shape of the optical fiber assembly 2 as described below. Allowing the optical fiber assembly 2 to freely twist and untwist along the remainder of its length enables the laws of elastic tube theory to apply, while also permitting explicitly-defined value of curvature, bending angle, and torsion to follow the known Frenet-Serret curvature equations.

Figure 5:
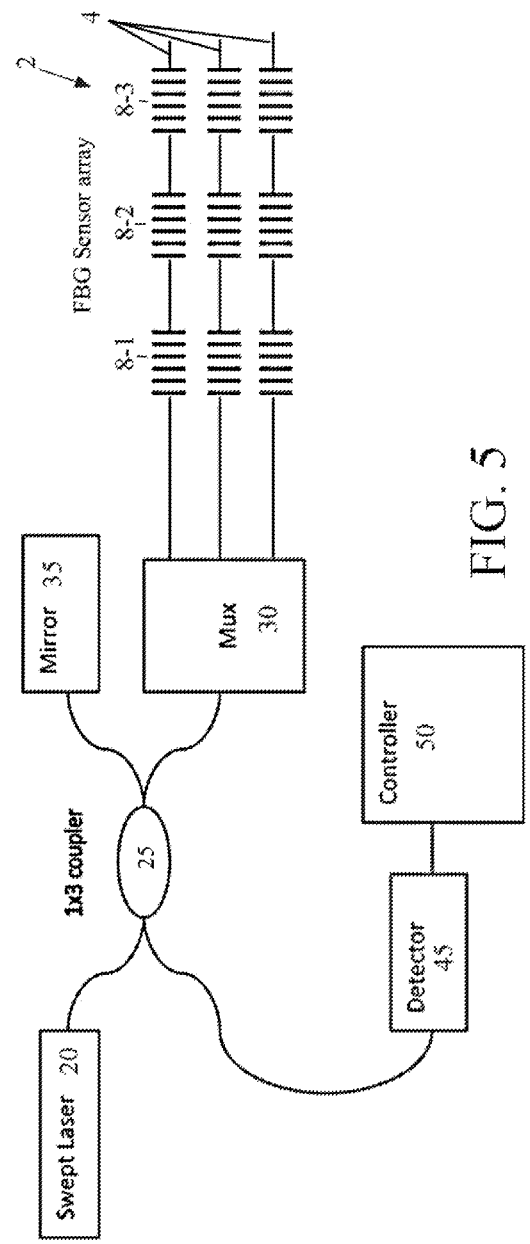
FIG. 5 illustrates a structural health monitoring (SHM) system in accordance with the present invention.

FIG. 5 illustrates the structural health monitoring (SHM) system of the present invention. A tunable swept laser 20 is used to interrogate the sensors 8 using optical frequency domain reflectometry, which defects subtle shifts in the wavelength reflected by the sensors in response to strain on the fibers. Each sensor 8 is continuously queried and the reflections are multiplexed by multiplexer (MUX) 30 to a conventional 1×3 fiber optic coupler 25, are then captured on an optical detector 45, and the detector output is sent to controller 50 for analysis by software analytics (described below) that determine the strain magnitude ϵ at each sensor 4.

Referring back to FIG. 4, each co-located trio of sensors 8-1, 8-2, 8-3 defines a strain sensor triplet, and each triplet is positioned along the length of each fiber core 4 at a known interval. Since the fiber cores 4 are all seated into the same body 16, the respective strain information gained from each rite three sensors of each triplet 8-1, 8-2, 8-3 is inter-correlated. Thus, by translating the strain components at each triplet (or cross-section) into its respective curvature and torsion, the bending shape of the entire fiber 2 can be determined and rendered.

The software resident in controller 50 includes programmed instructions for carrying out an analytical method that uses beam theory (of a bending tubular body) to calculate curvature, bending angle and torsion of the entire fiber assembly 2 based on empirically collected strain data, and from that determines the shape of the fiber 2 in a Cartesian coordinate system by solving a series of ordinary differential equations (ODEs) derived from the known Frenet-Serrat equations. The use of curvature, bending angle, and torsion data calculated from empirically collected strain data eliminates the need for computationally time-intensive curve-fitting as is required by prior art methods, and so the controller 50 can be a standard computer and is nevertheless capable of displaying the three-dimensional shape of the optical fiber 2 in real-time.

Figure 6:
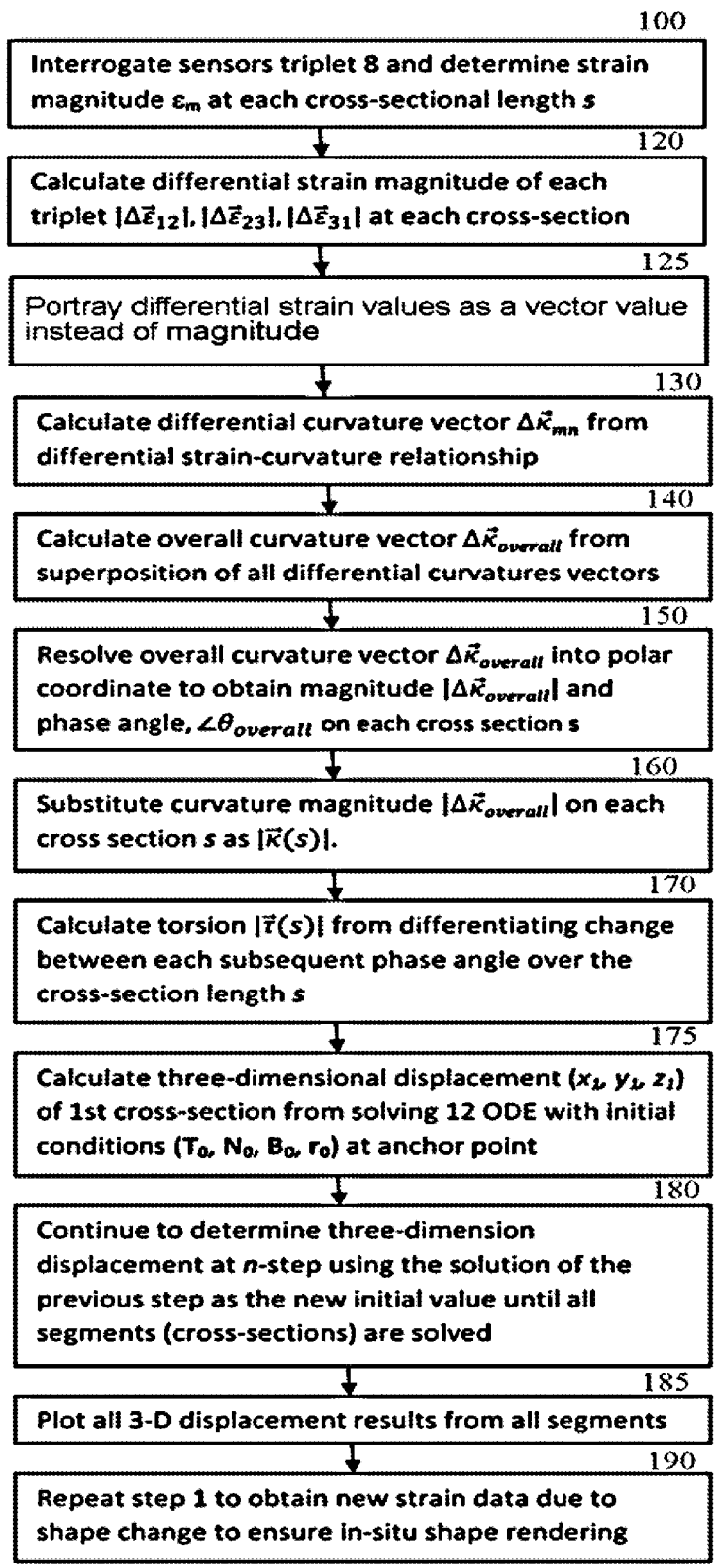
FIG. 6 is a flow chart of the software method steps of real-time shape sensing according to the present invention.

In essence, the software method of real-time shape sensing comprises the individual steps shown in FIG. 6. Initially, prior to step 100, the radius r (see FIG. 3) of the fiber assembly 2 is determined.

At step 100, laser 20 interrogates the sensor's triplet 8-1 ... 3 and the controller 50 determines the strain magnitude ($\epsilon_1$, $\epsilon_2$, $\epsilon_3$) at each sensor 8 from the length change L due to stress. When the length change of optical fiber sensor is L, the strain ϵ of an optical fiber is $\Delta L/L$.

At step 120, given the strain magnitude $\epsilon_1$, $\epsilon_2$, $\epsilon_3$ at each sensor 8, the controller determines differential strain values relative to the strain magnitudes of the other two sensors 8 within the corresponding triplet. Thus, instead of calculating strain ($\epsilon_1$, $\epsilon_2$, $\epsilon_3$) directly for each sensor 8, the differential strain is calculated between each of the sensors 8 within each triplet, resulting in three scalar differential strain magnitude ($|\Delta\vec{\epsilon}_{12}|$, $|\Delta\vec{\epsilon}_{23}|$, $|\Delta\vec{\epsilon}_{31}|$) at each fiber 2 cross section, as seen in FIG. 3. This is accomplished as follows:

$$|\Delta\vec{\epsilon}_{12}| = \vec{\epsilon}_1 - \vec{\epsilon}_2$$

$$|\Delta\vec{\epsilon}_{23}| = \vec{\epsilon}_2 - \vec{\epsilon}_3$$

$$|\Delta\vec{\epsilon}_{31}| = \vec{\epsilon}_3 - \vec{\epsilon}_1$$

By the rule of superposition, the overall strain magnitude for each cross-section is the summation of all the differential strain magnitudes of each cross-section, as follows:

$$|\Delta\vec{\epsilon}_{overall}| = |\Delta\vec{\epsilon}_{12}| + |\Delta\vec{\epsilon}_{23}| + |\Delta\vec{\epsilon}_{31}|$$

This assumption is also valid for the overall strain vector as a superposition of all the differential strain vectors within the cross-section, where $$\Delta\vec{\epsilon}_{overall} = \Delta\vec{\epsilon}_{12} + \Delta\vec{\epsilon}_{23} + \Delta\vec{\epsilon}_{31} \quad (10)$$

At step 125, differential strain values are portrayed as a vector value instead of its magnitude, since each corresponding differential strain values are offset by its phase angle difference of $2\pi/3$. By arbitrarily stating the initial phase angle of $\pi/6$ for $\epsilon_{31}$, the differential strain vector can be stated as follows in terms of polar coordinate, bounded by $-\pi$ to $\pi$ in the polar coordinate. This is illustrated on FIG. 7, which shows a perspective illustration of the differential strain and differential curvature for the three-core optical fiber assembly of either FIGS. 1-2.

$$\Delta \vec{\varepsilon}_{12} = |\Delta \vec{\varepsilon}_{12}| \angle \frac{5\pi}{6}$$

$$\Delta \vec{\varepsilon}_{23} = |\Delta \vec{\varepsilon}_{23}| \angle -\frac{\pi}{2}$$

$$\Delta \vec{\varepsilon}_{31} = |\Delta \vec{\varepsilon}_{31}| \angle \frac{\pi}{6}$$

At step 130, the software determines a curvature-differential strain relationship that relates the magnitude of curvature of the fiber assembly 2 at a given point to the magnitude of the differential strain values ($\epsilon_{12}$, $\epsilon_{23}$, $\epsilon_{31}$) at each optical fiber assembly 2 cross section, for the three sensors 8 at the corresponding triplet 8-1, 8-2, 8-3. and the radius (or diameter) of the fiber assembly 2 (a known constant from step 100).

To illustrate step 130, FIG. 8 shows the mechanics of a bending optical fiber core 4 along a segment of length of AB, where the neutral axis (dotted line) is parallel to the bending axis, and the radius of curvature R is orthogonal to the neutral axis. View (A) at left is before strain is applied, and (B) is after strain is applied. Deformation occurs turn the length difference A'B'. Each "cross section" of the optical fiber assembly 2 is defined as the measurement length of one of the embedded fiber sensor triplets 8-1, 8-2, 8-3. From step 120 above for normal strain $\Delta\epsilon = \Delta L/L$, where L indicates length change due to stress to the bending beam. Before strain at FIG. 8(A), L= $\overline{AB}$ is the same for the neutral axis throughout all section of the bending beam. However, as strain is applied to the beam at FIG. 8(B), the length changes above the neutral axis is L'= $\overline{A'B'}$. Therefore the strain change is as follows (5):

$$\Delta \varepsilon = \frac{\overline{A'B'} - \overline{AB}}{\overline{AB}} \tag{5}$$

Since the radius of curvature (R) is defined as the radius difference of a curve at a known point (ds=R d$\theta$), one can describe the length difference before and after induced strain as follows:

$$\overline{AB} = R\, d\theta \tag{6}$$

$$\overline{A'B'} = (R-d)d\theta \tag{7}$$

where d describes the distance between the neutral axis and the bending length.

Figure 9:
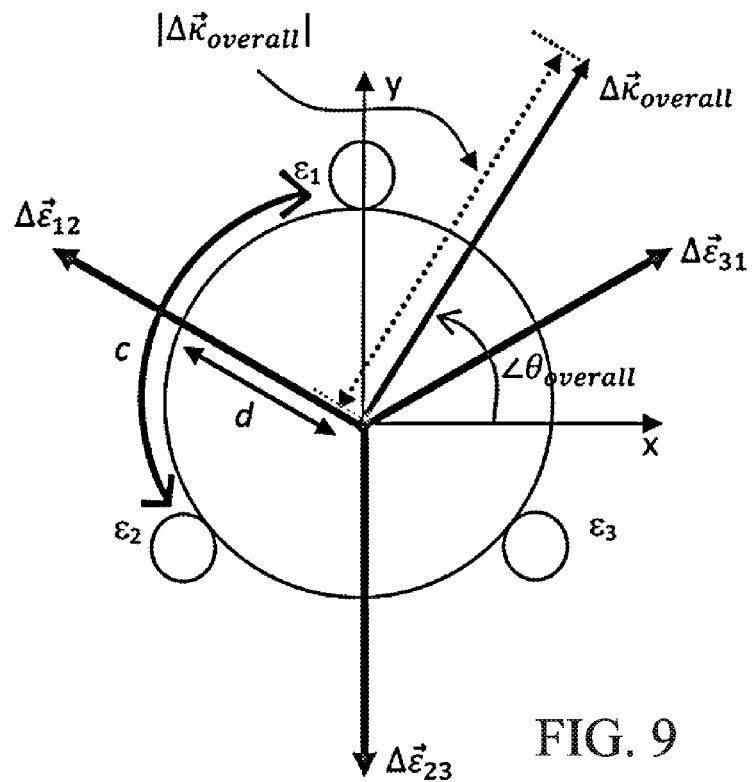
FIG. 9 is a perspective drawing illustrating curvature and phase angle for the three-core optical fiber assembly 2.

FIG. 9 is a perspective drawing illustrating curvature and phase angle for the three-core optical fiber assembly 2, the larger inner circle indicates the stem structure, and the three outer circles depicting the three strain sensor-embedded fiber cores 4. The length d is expressed by the radius between the center of the cylinder (where the neutral axis is located) and the outer circumference of the cylinder, where the fiber is being placed. Plugging equation (6) and (7) into (5) yields:

$$\Delta \varepsilon = \frac{(R-d)d\theta - Rd\theta}{Rd\theta} = \frac{Rd\theta - dd\theta - Rd\theta}{Rd\theta} = \frac{-d}{R} \tag{8}$$

And since curvature ($\kappa$) is defined as the inverse of R (such that $\kappa=1/R$), now we can replace R on equation (8)

$$\Delta\epsilon = -d^*\kappa \rightarrow |\Delta \vec{\epsilon}_{mn}| = -d^* |\vec{\kappa}_{mn}| \tag{9}$$

where the curvature value is proportional to magnitude of differential strain.

Rewriting the strain-curvature relationship in (9) in terms of vectors, the differential curvature vector for each differential strain vector is as follows.

$$\Delta \vec{\epsilon}_{12} = -d^* \vec{\kappa}_{12}$$

$$\Delta \vec{\epsilon}_{23} = -d^* \vec{\kappa}_{23}$$

$$\Delta \vec{\epsilon}_{31} = -d^* \vec{\kappa}_{31} \tag{12}$$

Figure 10:
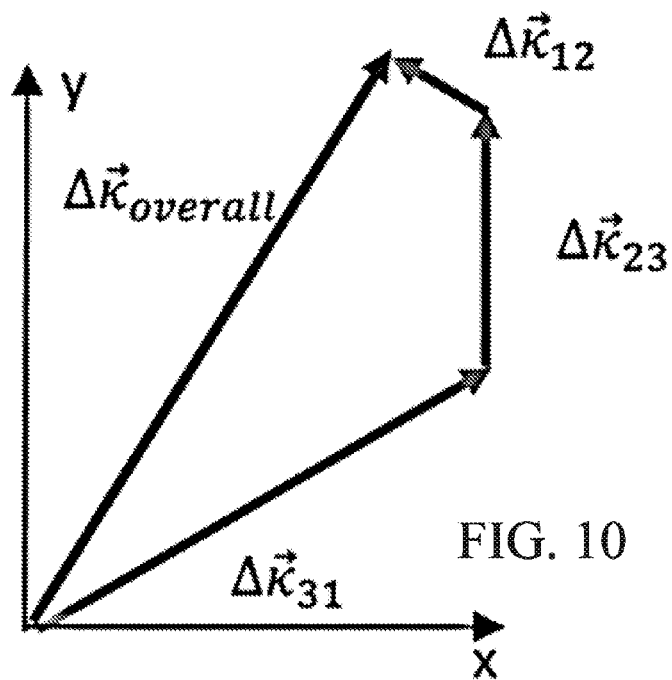
FIG. 10 illustrates the overall differential curvature for the cross-section from summation of all three differential curvature components.

FIG. 10 illustrates the overall differential curvature for the cross-section from summation of all three differential curvature components.

At step 140. we calculate the overall curvature vector $\Delta \vec{\kappa}_{overall}$ superposition of all differential curvatures vectors Referring back to FIG. 9, we see the overall curvature vector $\Delta \vec{\kappa}_{overall}$ as well as the magnitude value of the curvature ($|\Delta \vec{\kappa}_{overall}|$) and phase angle (bend angle, $\angle \theta_{overall}$) of the curvature vector. These two constants at each cross section (s) are used for the subsequent determination of shape from the Frenet Serret equations. Given that the overall strain in the fiber 2 in a given segment is the sum of the interrelated strain values of each fiber core 4, an overall curvature vector is determined by summation of the individual strain curvature vectors determined at step 130. The overall curvature vector contains both the magnitude and phase angle of the curvature for a given fiber segment.

By combining differential strain relationship of (10) and the curvature vector relation of (12), the overall curvature vector can now be defined below in (13), $$\Delta \vec{\epsilon}_{overall} = \Delta \vec{\epsilon}_{12} + \Delta \vec{\epsilon}_{23} + \Delta \vec{\epsilon}_{31}$$

$$\Delta \vec{\epsilon}_{overall} = -d^* \vec{\kappa}_{12} - d^* \vec{\kappa}_{23} - d^* \vec{\kappa}_{31}$$

$$\Delta \vec{\epsilon}_{overall} = -d^* \vec{\kappa}_{overall} \tag{13}$$

The overall curvature vector ($\vec{\kappa}_{overall}$) contains both the magnitude of the curvature, as well as the direction (angle) of curvature in radians. At step 150. the overall curvature vector is now be defined below in (14) expressed in polar coordinates.

$$\vec{\kappa}_{overall} = \Delta \vec{\kappa}_{12} + \Delta \vec{\kappa}_{23} + \Delta \vec{\kappa}_{31} = |\vec{78}_{overall}| \angle \theta_{overall} \tag{14}$$

The magnitude of the overall curvature ($|\vec{\kappa}_{overall}|$) depicts the strength of the bending that the fiber assembly 2 is experiencing, where the magnitude value is always positive. This curvature value represents the curvature for the particular cross-section that is being used as a constant ($\kappa(s)$) for determining shape from Frenet-Serret formula. At step 160, to determine the phase direction the software adds ail the known curvature vectors $\Delta \vec{\kappa}_{12} + \Delta \vec{\kappa}_{23} + \Delta \vec{\kappa}_{31}$ represented from the differential strain, as shown in FIG. 10.

Since the position of the fiber cores 4 is fixed at one end (the initial point), the angle for the curvature value $\theta_{im}$ can be geometrically determined. In (15) the magnitude as well as the phase angle for each individual portion in degrees is shown assuming the geometry represented in FIG. 9 (phase angle converted to degrees radians for calculation). The phase angle change is defined as angle of the overall curvature change, which is bounded from $-\pi$ to $\pi$ in the polar coordinate.

$$\vec{\kappa}_{12} = -\frac{\Delta\vec{\varepsilon}_{12}}{d} = |\vec{\kappa}_{12}|\angle\theta_{12} \rightarrow |\vec{\kappa}_{12}|\angle 5\pi/6 \quad (15)$$

$$\vec{\kappa}_{23} = -\frac{\Delta\vec{\varepsilon}_{23}}{d} = |\vec{\kappa}_{23}|\angle\theta_{23} \rightarrow |\vec{\kappa}_{12}|\angle -\pi/2$$

$$\vec{\kappa}_{31} = -\frac{\Delta\vec{\varepsilon}_{31}}{d} = |\vec{\kappa}_{31}|\angle\theta_{31} \rightarrow |\vec{\kappa}_{12}|\angle \pi/6$$

By summation of all curvature vector terms, as indicated in (13), the overall curvature magnitude ($|\vec{\kappa}(s)|$) as well as the phase angle ($\angle\theta(s)$) representing the fiber assembly two cross section with unit curve-length s is found, as seen in FIGS. 9-10.

Next, at step 170, given the phase angle from step 150, the lotion value is determined for each, segment as the difference of each subsequent phase angle over the differential curve length.

The torsion value (t(s)) can be obtained through the differential change between each subsequent phase angle change over the known curve-length. In practice, torsion is calculated as the difference of each subsequent phase angle of each cross-sectional area divided by the differential length of the curve-length, which is represented in (16).

$$|\vec{\tau}(s)| = \tau(s) = \frac{d\theta}{ds} \rightarrow \frac{\Delta\theta}{s} \quad (16)$$

At step 175, by obtaining the curvature, torsion and phase angle for each cross-section, and by presenting an initial value for the origin point, the location of each cross-section can be rendered via simplified Frenet-Serret equations, as explained below, and in particular by solving them via ordinary differential equations (ODE). This degree of simplification is what allows the resulting displacement information to be plotted and shown in real time.

Specifically, the curvature and torsion in conjunction with the known fiber assembly 2 point of origin and orientation, the three-dimensional shape of each segment of the fiber bundle can be determined by solving the ODEs and plotted in real time in a global Cartesian coordinate system as the optical fibers are being moved.

The Frenet-Serret formula is a set of differential equations, discovered independently by Jean F. Frenet and Joseph A. Serret during the mid-19$^{th}$ century. The Frenet-Serret equation describes how a differentials curve moves in space, which is described as the Frenet frame, where it has three components. T is the unit vector tangent to the curve, N is the normal, which is orthogonal to the tangent, and B is the binormal, which is described by the cross product of tangent and normal. The Frenet-Serret equation is shown as follow (17):

$$\frac{dT}{ds} = \kappa N \quad (17)$$

$$\frac{dN}{ds} = -\kappa T + \tau B$$

$$\frac{dB}{ds} = -\tau N$$

where $\kappa$ is the curvature and t is the torsion. From (17), the tangential value, and subsequently the displacement value can be found below. By the definition of unit tangent, the derivative of the curve-length defines the tangential vector, shown in (18).

$$T = \frac{dr}{ds} \quad (18)$$

as curve-length r can be reduced as follows (19) in Cartesian space, $$r = x\hat{i} + y\hat{j} + z\hat{k} \quad (19)$$

By using equations (17) thru (19), the Frenet-Serret equations can be expanded into 12 ordinary differential equations (ODE), $T'_x(s) = \kappa(s)N_x(s)$ $T'_y(s) = \kappa(s)N_y(s)$ $T'_z(s) = \kappa(s)N_z(s)$ $N'_x(s) = -\kappa(s)T_x(s) + t(s)B_x(s)$ $N'_y(s) = -\kappa(s)T_y(s) + t(s)B_y(s)$ $N'_z(s) = -\kappa(s)T_z(s) + t(s)B_z(s)$ $B'_x(s) = -t(s)B_x(s)$ $B'_y(s) = -t(s)B_y(s)$ $B'_z(s) = -t(s)B_z(s)$ $x'(s) = T_x(s)$ $y'(s) = T_y(s)$ $z'(s) = T_z(s)$ By solving the 12 ODEs, the 9 terms of the Frenet frame (T, N, B) as well as the 3 terms in the Cartesian space (x, y, z) are solved for each cross-section with length s that corresponds to the curvature and torsion term. However, to solve the 12 equation ODE, initial values for all 12 values must he specified.

The initial values for the 12 ODEs are based on the fixed points that correspond to the anchored point of the optical fiber. By setting the initial value $(T_0, N_0, B_0, r_0)$ to the default anchor point (fixed end of the liter assembly 2), then through solving the ODEs for each subsequent cross-section the entire fiber can be rendered spatially.

At step 185 the software plots all 3-D displacement, results from all segments.

In order to provide in-situ monitoring of shape rendering, the strain value of the sensor bundle is monitored continuously, where the change in strain will result is change of shape rendering immediately, based on the speed of the strain-to-shape algorithm. Thus, at step 195, the software repeats beginning at Step 100 to obtain new strain data, due to shape change to ensure in-situ shape rendering. Since shape-rendering, which requiring solving 12 ODEs simultaneously, is performed in multiple cross-sections, the computation requirement is less strenuous than solving the ODEs for the entire structure, a la via a curves-lifting method, and thus in-situ shape rendering can occur as fast as the acquisition rate of strain.

In summary, through calculating the curvature and torsion for each cross-section through a novel geometric relationship from continuously-obtained strafe values of multiple optical fibers, and subsequently solving the Frenet-Serret formula, the shape data of the entire optical fiber can he rendered concurrently.

It should now be apparent that the above-described system and method uses differential strain between the three fiber triplets, and differential curvature (both scalar values) in the formula), plus use not of the Frenet Serret equations, but instead of a derived set of 12 ordinary differential equations (ODE) that relate the Tangent (T), Normal (N) and Binormal (B) vectors, the 3D shape of the fiber assembly 2 (multi-core optical fiber) or 12 (multi-fiber bundle) can be calculated in real time and plotted, based on standard FBG strain data.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

What is claimed:

1. A method for determining a three-dimensional shape of an optical fiber assembly, comprising the steps of:
   providing an optical fiber assembly having three discrete uniform optical fiber cores equi-angularly spaced from each other at 120 degree separation about a common axis and each having a plurality of strain sensors disposed sequentially lengthwise there along;
   establishing a radius r of the optical fiber assembly;
   using a laser to interrogate the sensors of said optical fiber assembly;
   using a controller with memory for analysis of reflections of said laser, said controller analysis being performed by software comprising computer instructions stored on non-transitory memory for carrying out the following steps,
      determining a strain magnitude ($\epsilon_1$, $\epsilon_2$, $\epsilon_3$) at each sensor;
      determining differential strain values for each sensor relative to the other sensors in each triplet;
      calculating differential curvature from the differential strain values,
      calculating bend angle from the differential strain values,
      calculating overall differential strain between each of the three optical fiber cores as a vector value,
      calculating overall curvature as a vector value by summation of the overall differential strain vectors,
      calculating torsion for each segment,
      calculating a position of each cross-section by ordinary differential equations (ODEs) derived from Frenet-Serret equations,
   rendering a 3D shape of said optical fiber assembly.

2. The method for determining a three-dimensional shape of an optical fiber assembly according to claim 1, wherein said step of providing said optical fiber assembly further comprises providing a polymer sheath surrounding said three discrete optical fiber cores.

3. The method for determining a three-dimensional shape of an optical fiber assembly according to claim 1, wherein said step of providing said optical fiber assembly further comprises providing an elastic body having three lengthwise notches for seating said three discrete optical fiber cores.

4. The method for determining a three-dimensional shape of an optical fiber assembly according to claim 1, wherein said step of providing said optical fiber assembly, wherein said strain sensors are fiber Bragg gratings (FBGs).

5. The method for determining a three-dimensional shape of an optical fiber assembly according to claim 1, wherein each of the plurality of FBGs inscribed in each optical fiber core are positioned lengthwise evenly with respect to an FBG inscribed in each of the other optical fiber cores to provide a strain sensing triplet.

6. A method for determining a three-dimensional shape of an optical fiber assembly, comprising the steps of;
   providing an optical fiber assembly having three discrete uniform optical fiber cores equi-angularly spaced from each other at 120 degree separation about a common axis and each having a plurality of strain sensors disposed sequentially lengthwise there along at uniform increments such that a triplet of strain sensors are co-located at each increment:
   using a laser to interrogate the sensors of said optical fiber assembly:
   using a controller with memory for analysis of reflections of said laser, said controller analysis being performed by software comprising computer instructions stored on non-transitory memory for carrying out the following steps,
      determining a strain magnitude ($\epsilon_1$, $\epsilon_2$, $\epsilon_3$) at each sensor triplet;
      determining differential strain values for each sensor relative to the other sensors at each sensor triplet;
      calculating differential curvature from the differential strain values,
      calculate overall curvature from said differential curvature;
      calculating torsion for each increment;
   rendering a 3D shape of said optical fiber assembly by calculating a position of each cross-section ordinary differential equations (ODEs) derived from Frenet-Serret equations and displaying said rendered 3D shape.

7. The method for determining a three-dimensional shape of an optical fiber assembly according to claim 6, further comprising a step of repeating said substeps of analysis of reflections of said laser for all of said increments.

8. The method for determining a three-dimensional shape of an optical fiber assembly according to claim 7, further comprising a step of plotting the rendered 3D shape of said optical, fiber assembly at all of said increments.

9. The method for determining a three-dimensional shape of an optical fiber assembly according to claim 6, wherein said step of providing said optical fiber assembly further comprises providing a polymer sheath surrounding said three discrete optical fiber cores.

10. The method for determining a three-dimensional shape of an optical fiber assembly according to claim 6, wherein said step of providing said optical fiber assembly further comprises providing an elastic body having three lengthwise notches for seating said three discrete optical fiber cores.

* * * * *